United States Patent

[11] 3,579,083

[72] Inventor Lennart Bjork
   Ludvika, Sweden
[21] Appl. No. 873,539
[22] Filed Nov. 3, 1969
[45] Patented May 18, 1971
[73] Assignee Allmanna Svenska Elektriska Aktiebolaget
   Vasteras, Sweden
[32] Priority Nov. 4, 1968
[33] Sweden
[31] 14921/68

[54] PROTECTION MEANS FOR RECTIFIERS UPON THE OCCURENCE OF UNDESIRED DISCHARGE CURRENTS
   6 Claims, 1 Drawing Fig.
[52] U.S. Cl. ................................................ 321/13,
   315/135, 315/136, 315/340, 317/51, 317/61.5,
   321/14, 321/27
[51] Int. Cl. ....................................... H02m 1/18,
   H02h 7/10
[50] Field of Search .................................. 321/2.5, 12,
   13, 27, 14, 38; 323/4, 9; 315/194, 199, 135, 136,
   287, 291, 340; 317/43, 51, 61.5

[56] References Cited
UNITED STATES PATENTS

| | | | |
|---|---|---|---|
| 2,711,505 | 6/1955 | Hoover | 321/13 |
| 2,908,855 | 10/1959 | Hudson | 321/13 |
| 3,133,240 | 5/1964 | Fischer | 321/13 |
| 3,424,972 | 1/1969 | Ekstrom et al. | 321/38 |

Primary Examiner—James D. Trammell
Assistant Examiner—Gerald Goldberg
Attorney—Jennings Bailey, Jr.

ABSTRACT: For protecting a rectifier unit including a control pulse amplifier composed of a monostable multivibrator and an OR-gate, the gate being controlled by control pulses to cause the amplifier to transmit a signal to the control electrode to render it conducting, a transformer in the conductor for the rectifier is provided which makes the control pulse amplifier operative to emit a control signal in response to a flow of current in the conductor produced by an external flashover occurring when the rectifier is not conducting.

Patented May 18, 1971 3,579,083
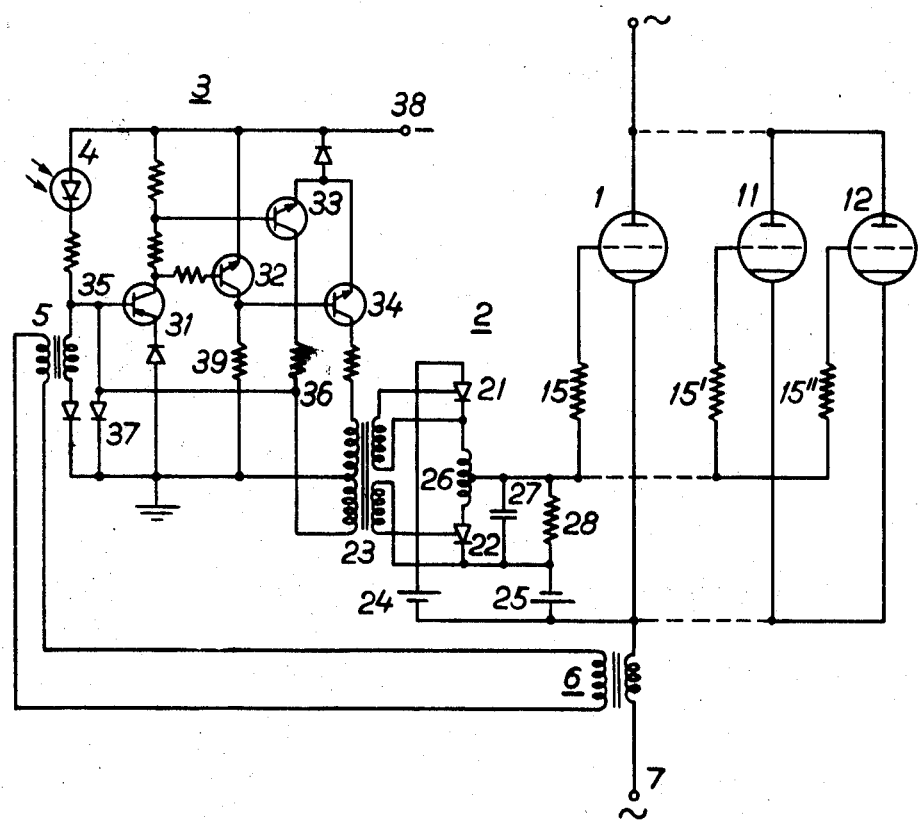
INVENTOR
LENNART BJÖRK
BY
Jennings Bailey, Jr

PROTECTION MEANS FOR RECTIFIERS UPON THE OCCURENCE OF UNDESIRED DISCHARGE CURRENTS

BACKGROUND OF THE INVENTION

1. Field of the Invention

The invention relates to a device for the protection of a rectifier or current valve which operates upon the occurrence of undesired discharge currents, the rectifier being provided with a control pulse amplifier, the input side of which is influenced from a control signal from a control pulse generator. The control signals in the form of control pulses, usually of the same length as the normal conducting intervals of the valve, are transmitted from the control pulse generator to the amplifier over an isolating transmission, for instance and insulating transformer or a light pulse transmission link. The expression "undesired discharge currents" relates to current pulses in the main circuit of the valve during the normal blocking interval of the valve.

2. The Prior Art

In a rectifier for instance in a current converter, an overvoltage can cause an external flashover, which may be difficult to extinguish. With parallel-connected valves, forming together a valve assembly, and having a common control pulse amplifier, an overvoltage may result in an arc-through in one of the valves, which thus may be overloaded and destroyed, or, in the case of ion valves, the valve arcing through may be ionized to such an extent that it would be difficult to extinguish. Also in this case one of the valves may be subjected to an outer flashover.

SUMMARY OF THE INVENTION

To avoid damage caused in this way, according to the invention such undesired discharge currents are allowed to excite a normal ignition of the valve, or the valves, by a signal to the control pulse amplifier, so that, in case of a flashover, the current path will be transferred to the inside of the valve, or, in other words, the outer arc is extinguished by being short circuited by the valve. With parallel valves, upon an arc-through of a valve, the current is distributed over all the parallel valves. A protection device according to the invention is characterized in that a current-sensitive means, for instance an impulse transformer, is connected to one of the conductors of the valve and also connected to one extra inlet of said control pulse amplifier. In this way the fault is transformed into a normal ignition course.

It is important after faults of this kind to establish a good deionizing circuit for the valve so that the blocking ability of the valve is rapidly restored. This is achieved according to a further development of the invention by connecting a deionizing voltage between the cathode of the valve and its control grid during the deionizing period after the conducting interval. The great deionizing current thus achieved is of importance not only for those cases where the protection device according to the invention has been effective, but also in the case of arcs-backs and arc-through of a single valve.

It is known with valves working in parallel to let them influence each other's control circuits over series-impedances or inductive current dividers to achieve a so-called "slave ignition" of subordinated valves, or to secure ignition of all valves. However, this principle is only applicable provided there are several parallel-connected valves, and it does not give any protection from outer flashover.

BRIEF DESCRIPTION OF THE DRAWING

The invention will be further described with reference to the enclosed drawing, which shows a schematic embodiment according to the invention.

DESCRIPTION OF THE PREFERRED EMBODIMENT

The drawing shows an ion valve 1 to the control grid of which is connected a control pulse amplifier comprising an output stage in the form of a monostable multivibrator 2 and an input stage, consisting of an OR-gate 3, to the one inlet 4 of which the normal control signal is connected and to the second inlet 5 of which is connected the signal from a current-sensitive means, for instance an impulse transformer 6, the primary side of which is connected to the cathode conductor 7 of the valve. The impulse transformer is suitably connected to the cathode-conductor, as the control pulse amplifier to which the impulse transformer is connected is also connected to the cathode potential.

The multivibrator 2 is constructed as a thyristor-multivibrator, known per se, comprising two series-connected thyristors 21, 22, connected in series with a commutation reactor 26, controlled from a control pulse transformer 23 and fed from a control voltage source 24 and a bias voltage source 25.

The OR-gate 3 is constructed like a three-stage transistor amplifier, the output stages 33, 34 of which have the form of a multivibrator, connected to the control pulse transformer 23 of the multivibrator 2. The OR-gate 3 has two inputs, namely the normal input 4 in the form of a photocell and the extra inlet 5 according to the invention, consisting of a transformer connected to the impulse transformer 6. The photocell 4 is influenced by the control pulses to the ion valve 1 by means of light pulses of a certain duration. The gate 3 is connected between a zero potential and a negative voltage at the terminal 38.

If no input signal appears on 4 or 5, the transistors 31, 32 and 33 are blocked, while the transistor 34 is conducting because of a control current over the base electrode, the emitter electrode and the resistance 39. Thus, the primary side of the transformer 23 is saturated with current in its upper half. If a light pulse from a control pulse generator, not shown, is fed to the photocell 4, this becomes conducting, whereupon the transistor 31 will receive control current and also becomes conducting. Thus, the base electrodes of the transistors 32 and 33 are connected to zero potential, resulting in these transistors being conducting. The transistor 34 receives negative potential on its base electrode and is therefore blocked. A current grows up through the lower half of the primary side of the transformer 23 and the transistor 33, resulting in a control current for the thyristor 21 being induced in the upper secondary winding of the transformer 23, said thyristor thus becoming conducting. Thus, the control voltage source 24 emits a positive grid voltage to the valve 1 over the resistance 15, said valve becoming conducting provided it has a positive anode voltage. Further, the capacitor 27 is charged.

When the light pulse to the photocell 4 has ceased, the transistor 31, 32 and 33 are blocked, while 34 becomes conducting. The transformer 23 is again remagnetized and a control current for the thyristor 22 is induced in the lower secondary winding of 23. The capacitor 27 is discharged over the thyristor 22 and the lower half of the commutation reactor 26 in which a blocking voltage for the thyristor 21 thus is induced. The valve 1 is assumed to be fed from an alternating voltage source, not shown, and the light pulses to the photocell 4 are in a suitable phase position with relation to this alternating voltage, and the valve 1 is therefore blocked when its anode voltage becomes negative in relation to the cathode. The bias voltage source 25 emits a deionizing current across the cathode and the grid of the valve 1 and the thyristor 22, which short circuits the resistance 28. In this way the deionizing circuit will have a low impedance so that an effective deionizing is obtained. When the transformer 23 is saturated with current, the control current to the thyristor 22 is interrupted, and this thyristor is blocked when the deionizing current in valve 1 ceases. Thereafter the bias voltage source 25 emits a negative bias voltage to the control grid of the valve 1 over the resistance 28.

If, for instance, an external flashover occurs in the valve 1, this will result in a current in the cathode conductor 7 and thus a voltage is induced on the secondary side of the impulse transformer 6, so that a signal is given to the input 5 of the OR-gate 3, which reacts in the same way as for the normal ignition course described above. Thus, the multivibrator 2 emits a control signal to the valve 1 which becomes conducting and short circuits the external flashover, which is then extinguished. When the transformer 6 is saturated with current, the signal to the transformer 5 is interrupted and the multivibrator 2 switched back to its original state, that is, the thyristor 22 is ignited and 21 extinguished. As described above, a good deionizing of the valve is again achieved by a deionizing circuit with low impedance which is extremely important to restore the blocking ability of the valve, for instance after an arc-through.

In case of three parallel valves 1, 11 and 12, all of them being controlled from the multivibrator 2, an arc-through of one of these valves or an external flashover, in a similar way, will result in a current in the cathode conductor 7, the multivibrator 2 thus being activated and all the valves ignited. The load current is evenly distributed and all the valves ignited. The load current is evenly distributed over all three valves by means of an inductive current divider, not shown, and the valves are not subjected to greater stresses than can be handled.

It should be clear that an ignition pulse is not allowed to occur from 4 or 5 during the time when the multivibrator 2 is returning to its off position, that is, when the thyristor 22 is conducting as this would means that the thyristors 21 and 22 would be conducting at the same time, which, in turn, would means a short circuit of the voltage sources 24 and 25 over the two thyristors.

To prevent this, the diode 37 and the connection between the points 35 and 36 are provided. During the remagnetization of the transformer 23, since the light pulse in the photocell 4 has ceased, the point 36 is kept positive in relation to the center of the transformer 23, and thus the diode 37 conducts a current. Thus, the secondary side of the transformer 5 is short circuited. To secure the function of the protection means 6, 5 also in this case, its time derivative should be so great that the signal for ignition of the thyristor 21 remains after the thyristor 22 has been blocked.

The time constant for the current-sensitive member 6 and its input circuit to the control pulse amplifier exceeds the time constant for the return of the monostable circuit from its unstable to its stable state.

Protection means for ion valves has been shown as an example in the drawing. The same protection means may, however, be used with advantage for semiconductor valves.

I claim:

1. In combination with conductor means having a rectifier means therein, said rectifier means having control electrode means and a control pulse amplifier connected to the control electrode means, said control pulse amplifier including means responsive to a control signal to render the amplifier operative to transmit a control pulse to said control electrode means to render said rectifier means conductive, means to protect the rectifier means from undesired discharge currents including means responsive to flow of current in said conductor means when said control pulse amplifier is inoperative to render the control pulse amplifier operative so as to cause said rectifier means to conduct current.

2. In a combination as claimed in claim 1, in which said rectifier means includes a plurality of rectifiers connected in parallel and said control electrode means includes a control electrode for each of said rectifiers, said control pulse amplifier being connected to all of said control electrodes.

3. In a combination as claimed in claim 2, said conductor means including a part common to all of said electrodes, said current-responsive means being responsive to the flow of current in such common part of the conductor means.

4. In a combination as claimed in claim 1, in which said control pulse amplifier includes a monostable multivibrator as its output stage, said multivibrator including means to supply a deionizing current across the electrode means and the cathode means.

5. In a combination as claimed in claim 4, said deionizing current supply means including a negative bias voltage source, an impedance connecting said bias voltage source to said control electrode means, and means to bypass said impedance in response to cessation of operation of said control pulse amplifier.

6. In a combination as claimed in claim 5, said monostable multivibrator influencing further means at said cessation of operation, said further means being blocking means for said control signal responsive means of said control pulse amplifier.